(12) United States Patent
Brunnecker

(10) Patent No.: US 11,014,308 B2
(45) Date of Patent: May 25, 2021

(54) METHOD FOR LASER BEAM PLASTIC WELDING, AND DEVICE

(71) Applicant: EVOSYS LASER GMBH, Erlangen (DE)

(72) Inventor: Frank Brunnecker, Memmelsdorf (DE)

(73) Assignee: EVOSYS LASER GMBH, Erlangen (DE)

( * ) Notice: Subject to any disclaimer, the term of this patent is extended or adjusted under 35 U.S.C. 154(b) by 25 days.

(21) Appl. No.: 16/330,311

(22) PCT Filed: Aug. 22, 2017

(86) PCT No.: PCT/EP2017/071123
§ 371 (c)(1),
(2) Date: Mar. 4, 2019

(87) PCT Pub. No.: WO2018/046291
PCT Pub. Date: Mar. 15, 2018

(65) Prior Publication Data
US 2019/0202135 A1 Jul. 4, 2019

(30) Foreign Application Priority Data
Sep. 6, 2016 (DE) ...................... 10 2016 216 844.4

(51) Int. Cl.
*B29C 65/16* (2006.01)
*B29C 65/00* (2006.01)
(Continued)

(52) U.S. Cl.
CPC .......... *B29C 65/1635* (2013.01); *B23K 26/03* (2013.01); *B23K 26/032* (2013.01);
(Continued)

(58) Field of Classification Search
CPC ............ B29C 65/1635; B29C 65/1616; B29C 66/24244; B29C 66/83221;
(Continued)

(56) References Cited

U.S. PATENT DOCUMENTS 7,245,378 B2   7/2007  Kwan et al.
2004/0150688 A1*  8/2004  Kwan ............... B29C 66/24244
                                                              347/19

(Continued)

FOREIGN PATENT DOCUMENTS

DE   10 2008 038 014 A1   2/2010
JP   2004-243629 A        9/2004
(Continued)

OTHER PUBLICATIONS

PCT/ISA/210, "International Search Report for International Application No. PCT/EP2017/071123", dated Nov. 7, 2017.

*Primary Examiner* — George R Koch
(74) *Attorney, Agent, or Firm* — Manabu Kanesaka

(57) ABSTRACT

The invention relates to a method for laser beam plastic welding, having the following steps: arranging a first mold part which substantially absorbs laser radiation on a receiving area, irradiating the first mold part using an electromagnetic radiation source, detecting the heat of the first mold part by means of a detector, generating an absorption profile of the first mold part, arranging a second mold part which is substantially transparent to laser radiation on the first mold part, and irradiating the two mold parts along the contour of a welding seam to be produced using a machining laser such that the energy input produced by the machining laser is controlled by a controller on the basis of the generated absorption profile of the first mold part.

16 Claims, 3 Drawing Sheets

Figure 1:
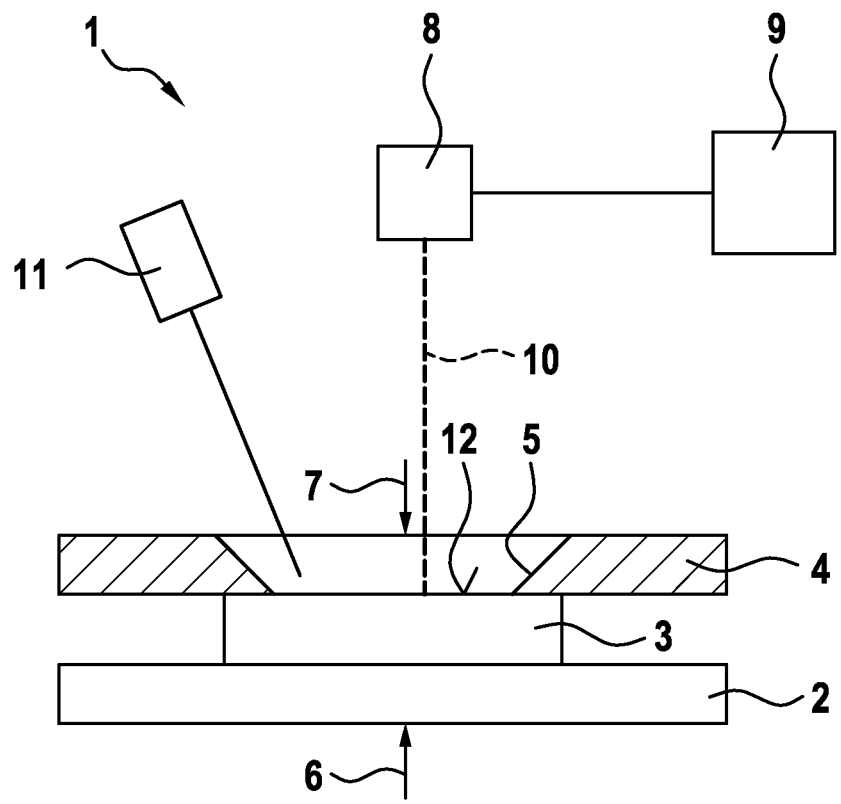

(51) Int. Cl.
  *B23K 31/12*   (2006.01)
  *B23K 37/04*   (2006.01)
  *B23K 26/244*  (2014.01)
  *B23K 26/082*  (2014.01)
  *B23K 26/08*   (2014.01)
  *B23K 26/03*   (2006.01)
  *B23K 26/324*  (2014.01)
  *B23K 103/00*  (2006.01)

(52) U.S. Cl.
  CPC .......... *B23K 26/034* (2013.01); *B23K 26/082* (2015.10); *B23K 26/0876* (2013.01); *B23K 26/0884* (2013.01); *B23K 26/244* (2015.10); *B23K 26/324* (2013.01); *B23K 31/125* (2013.01); *B23K 37/0408* (2013.01); *B29C 65/1616* (2013.01); *B29C 66/24244* (2013.01); *B29C 66/83221* (2013.01); *B29C 66/9121* (2013.01); *B29C 66/91216* (2013.01); *B29C 66/91643* (2013.01); *B29C 66/91951* (2013.01); *B29C 66/95* (2013.01); *B29C 66/961* (2013.01); *B23K 2103/42* (2018.08); *B29C 65/1609* (2013.01); *B29C 65/1654* (2013.01); *B29C 65/1677* (2013.01); *B29C 66/112* (2013.01); *B29C 66/114* (2013.01); *B29C 66/53461* (2013.01); *B29C 66/71* (2013.01); *B29C 66/7212* (2013.01); *B29C 66/836* (2013.01); *B29C 66/863* (2013.01)

(58) Field of Classification Search
  CPC .......... B29C 66/9121; B29C 66/91216; B29C 66/91643; B29C 66/91951; B29C 66/95; B29C 66/961; B29C 66/836; B29C 66/863; B29C 66/7212; B29C 66/71; B29C 66/53461; B29C 66/114; B29C 66/112; B29C 665/1677; B29C 65/1654; B29C 65/1606; B23K 26/082; B23K 26/244; B23K 26/03; B23K 26/032; B23K 26/034; B23K 29/0876; B23K 26/0884; B23K 26/324; B23K 31/125; B23K 37/0408; B23K 2103/42
  See application file for complete search history.

(56) References Cited

U.S. PATENT DOCUMENTS

| | | | |
|---|---|---|---|
| 2005/0169346 A1* | 8/2005 | Murray, Jr. | B23K 26/034 374/121 |
| 2007/0084552 A1* | 4/2007 | Watanabe | B29C 65/1658 156/272.8 |
| 2007/0181571 A1* | 8/2007 | Prevost | B29C 66/8322 219/757 |
| 2013/0112650 A1 | 5/2013 | Karam et al. | |
| 2018/0111327 A1* | 4/2018 | Watanabe | B29C 66/21 |

FOREIGN PATENT DOCUMENTS

| | | |
|---|---|---|
| JP | 2009-061459 A | 3/2009 |
| JP | 2009-166115 A | 7/2009 |

\* cited by examiner

METHOD FOR LASER BEAM PLASTIC WELDING, AND DEVICE

RELATED APPLICATIONS

The present application is National Phase of International Application No. PCT/EP2017/071123 filed Aug. 22, 2017, and claims priority from German Application No. 10 2016 216 844.4, filed Sep. 6, 2016, the disclosure of which is hereby incorporated by reference herein in its entirety.

The invention relates to a method for laser beam plastic welding and to a corresponding device.

In the case of laser beam plastic welding known per se, two mold parts produced from a plastics material are connected to one another. Here, a first mold part substantially absorbs the laser radiation. A second mold part is substantially transparent to the laser radiation. The radiation generated by a radiation source, in particular laser radiation, penetrates the second (upper) transparent mold part and is absorbed by the first (lower) mold part, which is thus brought into a plasticized or molten state. The two mold parts are fixed in this state by a holder. By means of thermal conduction, the transparent second part is also plasticized or melted locally at a contact area between the two mold parts. A connection is created between the two mold parts under the action of the pressure produced by the holder.

In order to produce a high-quality fault-free welded connection, it is necessary to accurately dose the used beam power. The energy available for the welding process is dependent on the transmission of the transparent mold part. It has therefore already been proposed in document U.S. Pat. No. 7,245,378 B2 to detect the transmission of a transparent mold part before carrying out a laser welding process.

In practice, certain properties of the laser radiation of the substantially absorbing mold part are subject to fluctuations, whereby the quality of the welded connection may be influenced. Examples of this are gate points of injection-molded parts, where there may be an accumulation of glass fibers. Further influencing factors are for example the carbon black content of a colored plastic, the content of a corresponding absorber additive, or the water uptake in plastics such as polyamide, or the conditioning. It has also been observed that different batches of the plastics granular material used for the injection molding are subject to fluctuations. In addition, the absorption can be heavily influenced by the temperature control during the injection molding process.

The object of the invention is therefore to describe a method for laser beam plastic welding which enables reliable production of the welded connection, even if the properties of the materials used for the mold part fluctuate.

In order to achieve this object, a method for laser beam plastic welding is provided, having the following steps:
  arranging a first mold part which substantially absorbs laser radiation on a receiving area,
  irradiating the first mold part using an electromagnetic radiation source,
  detecting the heat of the first mold part by means of a detector,
  generating an absorption profile of the first mold part,
  arranging a second mold part which is substantially transparent to laser radiation on the first mold part, and
  irradiating the two mold parts along the contour of a welding seam to be produced using a machining laser such that the energy input produced by the machining laser is controlled by a controller on the basis of the generated absorption profile of the first mold part.

The invention is based on the finding that a reliable welded connection can be obtained by detecting and taking into consideration the absorption behavior of the mold part that substantially absorbs the laser radiation. In contrast to conventional methods, in which the transmission of the (upper) mold part is detected, it is provided in accordance with the invention to detect the absorption coefficient of the lower mold part absorbing the laser radiation. By detecting the absorption, the subsequent welding process can be influenced such that the energy introduced into the joining zone is sufficient to plasticize or locally melt the lower mold part. On the other hand, the introduced energy is not so high that it leads to a local overheating and material damage. Thus, the energy introduced for the welding process can be dosed in a perfectly suited manner in accordance with the invention.

The method according to the invention thus provides that merely the first mold part substantially absorbing the laser radiation is initially arranged on a receiving area. Merely this first mold part is then irradiated, and the heat thereof detected by means of a detector. An absorption profile of the first mold part is generated on the basis of this measured data. The transparent second part is then arranged on the first mold part and is preferably fixed by means of a holder, such that both mold parts are held by a compressive force. The radiation is then effected by means of the machining laser, wherein the energy input is controlled on the basis of the generated absorption profile of the first mold part.

In the method according to the invention it is preferred that the energy input in the event of irradiation with the machining laser is reduced by the controller at those points of the first mold part that have a higher absorption. The term "higher absorption" can relate for example to a mean value of the absorption of the first mold part. If a higher absorption compared to the mean value is provided locally, the energy input is reduced there locally. Instead of a mean value, a threshold value of the absorption may also be selected as reference variable.

Similarly, it may be provided in the method according to the invention that the energy input in the event of irradiation with the machining laser is increased by a controller at those points of the first mold part that have a lower absorption compared to the mean value. The term "lower absorption" can relate either to a mean value of the absorption or to a fixed threshold value. Accordingly, the energy input in the event of irradiation with the machining laser is controlled on the basis of the local absorption given from the generated absorption profile of the first mold part. The generated absorption profile specifies a relationship between a position along the contour of a welding seam to be produced and the absorption detected at this point.

A preferred embodiment of the method according to the invention provides that the first mold part is irradiated by means of the machining laser in order to produce the absorption profile. This results in the advantage that merely a single machining laser is required as radiation source, it is also conceivable in principle to use a first laser beam source to produce the absorption profile and a second laser beam source as machining laser.

In the method according to the invention it is preferred that the first mold part is irradiated along a defined path in order to produce the absorption profile, and the absorption profile is detected along the path. Here, the laser beam travels over the defined path. As already explained, the absorption profile specifies the relationship between the local absorption of the laser radiation in the substantially absorbing mold part along the contour of the welding seam to be produced. The absorption profile is thus preferably detected along the contour of the welding seam to be produced.

In accordance with a development of the method according to the invention a pyrometer or an infrared camera is used as detector. The temperature of a point of the mold part can be detected by means of a pyrometer. A two-dimensional image of the absorption of an area of the mold part can be produced by means of an infrared camera.

In the method according to the invention a machining laser with a wavelength between 600 nm and 2500 nm is preferably used. Here, a machining laser in the near infrared range, which for example has a wavelength of 980 nm, is particularly preferred.

In the method according to the invention it may also be provided that a machining laser attached to a movement device is used, wherein the movement device is configured as an x-y axis system, as a robot, or as a galvanometer scanner. By means of the movement device, the machining laser attached thereto is moved such that the contour of the welding seam to be produced is irradiated by the electromagnetic radiation source.

A further variant of the method according to the invention provides that a transmission profile of the transparent second mold part is generated, and the energy input generated by the machining laser is also controlled depending on the generated transmission profile of the second mold part. The generation of the transmission profile, however, is optional. It is possible to measure the transmission of the transparent mold part and also the absorption of the absorbing mold part. To this end, the transparent mold part is also irradiated by the machining laser and thus heated. Most engineering plastics which are used for transparent mold parts have an absorption ranging from 2 to 40%. The transparent mold part heats up accordingly under irradiation, and the same detector can detect the heat, and the transmission can be determined on the basis of the detected heat. A more intense heat, for example, indicates a lower transmission.

In addition, the invention relates to a device for laser beam plastic welding comprising a first receiving area for a first mold part, an electromagnetic radiation source with a movement device, a second receiving area for a second mold part placed on the first mold part, and a detector for detecting the heat of a mold part. The device according to the invention is configured to carry out the described method.

The device according to the invention preferably comprises a controller which is connected to an electromagnetic radiation source and the detector and is configured to control the electromagnetic radiation source such that the first mold part is irradiated, the heat thereof is detected by means of the detector, and an absorption profile of the first mold part is produced, wherein, once the second mold part substantially transparent to laser radiation is arranged on the first mold part, both mold parts are irradiated along the contour of a welding seam to be produced using a machining laser, such that the energy input produced by the machining laser is controlled by the controller on the basis of the generated absorption profile of the first mold part.

In the device according to the invention it can be provided that said device has a handling means for picking up and placing the second mold part on the first mold part. The handling means for example can be configured as a robot gripper.

In the device according to the invention the detector is preferably arranged on the same side as the electromagnetic radiation source.

Figure 2:
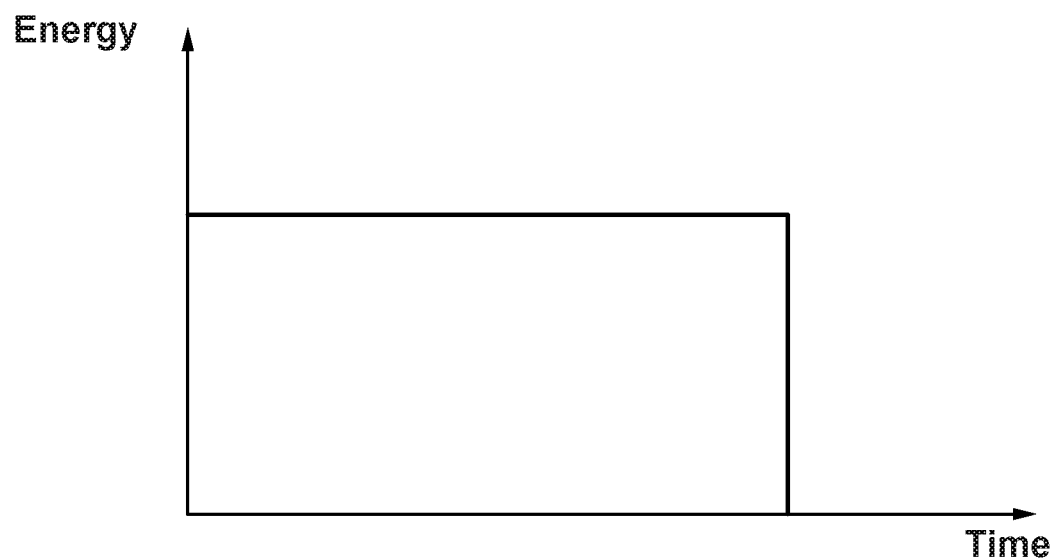
Figure 3:
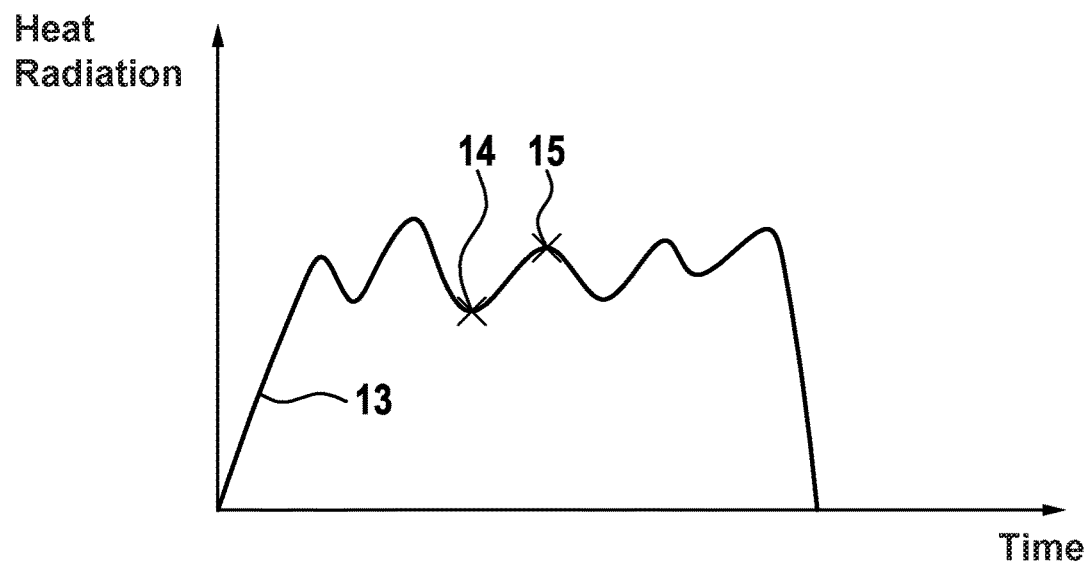
Figure 4:
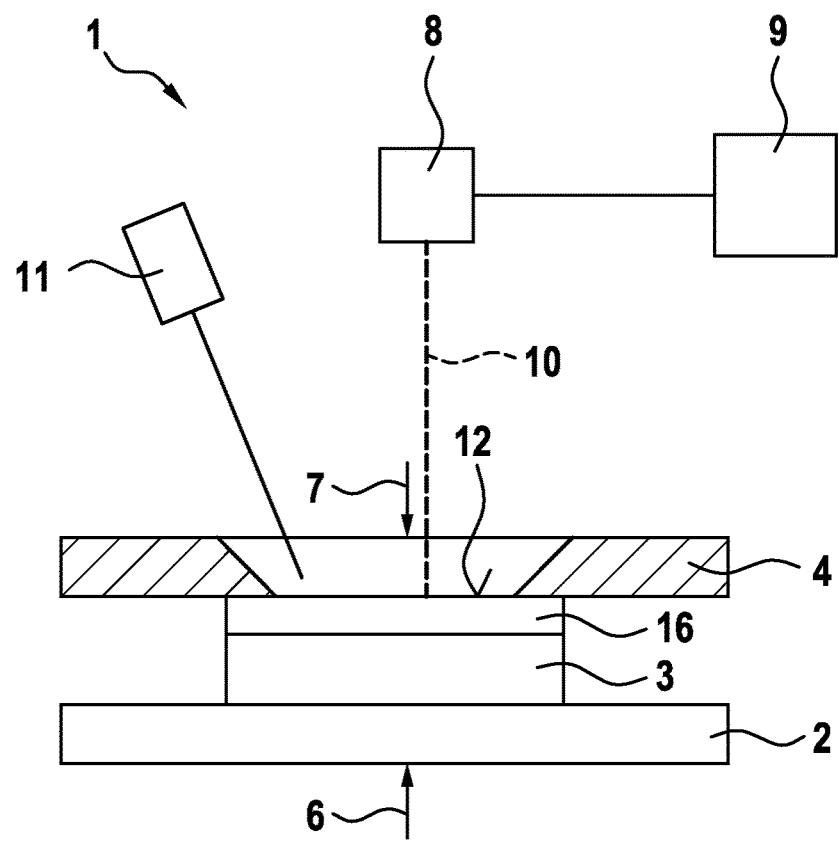
Figure 5:
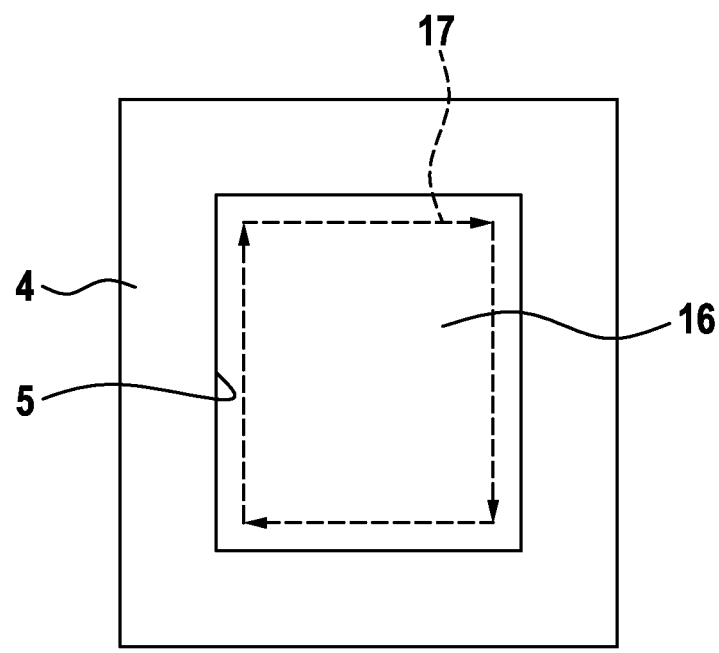

Further advantages and details of the invention will be explained hereinafter on the basis of exemplary embodiments and with reference to the drawings. The drawings are schematic illustrations and show:

FIG. 1 a side view of an exemplary embodiment of a device according to the invention;

FIG. 2 an energy-time graph;

FIG. 3 a graph which shows the heat radiation over time;

FIG. 4 the device according to the invention according to FIG. 1 with two mold parts; and FIG. 5 a plan view of a mold part and the path of the laser beam.

FIG. 1 shows a side view of an exemplary embodiment of a device 1. The device 1 comprises a receiving area 2 for a first mold part 3. The receiving area 2 is configured as a clamping device and cooperates with a holder 4, which together with the receiving area 2 forms the clamping device. The holder 4 has a recess 5, which is adapted to the size and shape of the first mold part 3. It can be seen in FIG. 1 that the first mold part 3 is received and held between the holder 4 and the receiving area 2. In this state the clamping device consisting of the receiving area 2 and the holder 4 exerts a compressive force, represented schematically by the two2 arrows 6, 7, on the mold part 3.

The device 1 is provided for laser beam plastic welding, wherein the first mold part 3 is connected to a second mold part (not shown in FIG. 1). In order to ensure that during the welding process exactly the amount of energy required for plasticizing or melting is supplied, the first mold part 3 is firstly irradiated with a radiation source configured as a machining laser 8. The machining laser 8 is controlled by controller 9 in such a way that a laser beam 10 is moved over the surface of the first mold part 3 along a defined contour. The defined contour is rectangular in this exemplary embodiment. Under the action of the laser beam 10, the irradiated surface of the first mold part 3 heats up depending on the absorption. This absorption is detected by means of a detector 11, which is arranged in the vicinity of the machining laser 8 and is directed towards a surface 12 of the first mold part 3. In this exemplary embodiment the detector 11 is configured as a pyrometer. The pyrometer makes it possible to detect the temperature at specific points of the surface 12 heated by the laser beam 10.

FIG. 2 is a graph that shows the energy input by the machining laser 8 over time. It can be seen in FIG. 2 that the irradiation energy generated by the machining laser 8 is constant over time.

FIG. 3 is a graph that shows the heat radiation, detected by the detector 11, of the surface 12 of the irradiated first mold part 3. The detector 11 configured as a pyrometer trails the machining laser 8 by the controller 9, such that the movement of the detector 11 is coupled to the movement of the machining laser 8 in that the detector 11 trails the machining laser 8. Since the detector 11 measures the temperature of the surface 12 of the first mold part 3 at different points at various moments in time, the graph shown in FIG. 3 also shows the detected heat radiation along the contour passed over by the machining laser 8. The graph shown in FIG. 3 therefore can be interpreted not only as a representation of the heat radiation over time, but also as a representation of the heat radiation in relation to the irradiated contour.

The curve 13 shown in FIG. 3 comprises a point 14 at which the heat radiation is relatively low. This is a relatively cold point. Thus, the absorption at this position is low. By contrast, the heat radiation at the point 15 is relatively high. This is thus a warm point on the surface 12 of the first mold part 3. A warm point means that the absorption of the first mold part 3 is high. Accordingly, the curve 13 indicates the absorption of the first mold part 3 along the contour passed over by the machining laser 8. The curve 13 thus represents the absorption profile of the first mold part 3.

FIG. 4 is an illustration similar to FIG. 1 and shows the device 1 with the receiving area 2, the first mold part 3, and the holder 4. The laser radiation is substantially absorbed on the first mold part 3 if a second mold part 16 is placed in position and is substantially transparent to laser radiation. The two mold parts 3, 16 are held in a clamped manner between the receiving area 2 and the holder 4. In this exemplary embodiment the holder 4 is used on the one hand to detect the absorption profile of the first mold part 3 and on the other hand to weld the first and the second mold part 3, 16. In other embodiments two different holders can also be used for the detection of the absorption profile and for the subsequent welding process.

The welding process is carried out in the braced or clamped state shown in FIG. 4 in that the first and the second mold part 3, 16 are acted on by a clamping force configured as compressive force. Energy is input by means of the machining laser 8 and passes through the second mold part 16, which is substantially transparent to laser radiation, and heats the surface 12 of the first mold part 3 arranged there-beneath until the plastic plasticizes. The machining laser 8 is in the meantime controlled by the controller 9 such that the laser beam 10 is guided along the defined contour. In so doing, the first mold part 3 melts locally. By heat conduction, the underside of the second mold part 16 is also heated to such an extent that the two mold parts 3, 16 bond to one another under the action of the clamping force. The energy input generated by the machining laser 8 is controlled during the welding process by the controller 9 on the basis of the absorption profile of the first mold part 3 shown in FIG. 3. The energy input in the event of irradiation using the machining laser 8 is reduced by the controller 9 at those points of the first mold part 3 that have a higher absorption, for example at the point 15. On the other hand, the energy input in the event of irradiation using the machining laser 8 is increased by the controller 9 at those points of the first mold part 3 that have a lower absorption. An example of this is the point 14, at which the absorption is lower.

The device 1 is intended for the series production of mold parts made of plastic welded to one another. The first mold part 3 and the second mold part 16 are picked up and placed in position by a handling means. The first mold part 3 is firstly placed on the receiving area 2 by means of the handling means, in order to produce the absorption profile. The second mold part 16 is then placed on the first mold part 3 by means of the handling means. Once the welding process has been carried out, the component formed from the two mold parts 3, 16 is removed from the receiving area 2 by means of the handling means.

FIG. 5 is a plan view and shows the holder 4, which has the recess 5 and the clamped second mold part 16. The arrows 17 and dashed lines show the path of the laser beam 10 and therefore the irradiated contour of the second mold part 16. It can be seen that the machining laser 8 travels over a rectangular path, whereby a rectangular welding seam is formed.

LIST OF REFERENCE SIGNS 1 device
2 receiving area
3 first mold part
4 holder
5 recess
6 arrow
7 arrow
8 machining laser
9 controller
10 laser beam
11 detector
12 surface
13 curve
14 point
15 point
16 second mold part
17 arrow

The invention claimed is:

1. A method for laser beam plastic welding, comprising following steps:
    arranging a first mold part which substantially absorbs laser radiation on a receiving area,
    irradiating only the first mold part using an electromagnetic radiation source,
    detecting a heat of the first mold part by a detector,
    generating an absorption profile of the first mold part based on the heat of the first mold part detected by the detector,
    arranging a second mold part which is substantially transparent to the laser radiation on the first mold part after generating the absorption profile of the first mold part, and
    irradiating the first mold part and the second mold part along a contour of a welding seam to be produced using the electromagnetic radiation source such that an energy input produced by the electromagnetic radiation source is controlled by a controller based on the generated absorption profile of the first mold part.

2. The method according to claim 1, wherein in the step of irradiating the first mold part and the second mold part using the electromagnetic radiation source, the energy input is reduced by the controller at points of the first mold part that have a higher absorption.

3. The method according to claim 1, wherein in the step of irradiating the first mold part and the second mold part using the electromagnetic radiation source, the energy input is increased by the controller at points of the first mold part that have a lower absorption.

4. The method according to claim 1, wherein the first mold part is irradiated by the electromagnetic radiation source in order to produce the absorption profile.

5. The method according to claim 1, wherein in order to produce the absorption profile the first mold part is irradiated along a defined path, and the absorption profile is detected along the path.

6. The method according to claim 5, wherein the contour of the welding seam to be produced is used as the defined path for producing the absorption profile.

7. The method according to claim 1, wherein a pyrometer or an infrared camera is used as the detector.

8. The method according to claim 1, wherein the electromagnetic radiation source with a wavelength between 600 nm and 2500 nm is used.

9. The method according to claim 1, wherein the electromagnetic radiation source is attached to a movement device, wherein the movement device is as one of an x-y axis system, a robot, and a galvanometer scanner.

10. The method according to claim 1, wherein in the step of irradiating the first mold part and the second mold part using the electromagnetic radiation source, a transmission profile of the transparent second mold part is produced and the energy input produced by the electromagnetic radiation source is also controlled based on the produced transmission profile of the second mold part.

11. The method according to claim 1, wherein in the step of irradiating only the first mold part, the electromagnetic radiation source is attached to a movement device, and the movement device moves along a contour on the first mold part while the electromagnetic radiation source irradiates only the contour on the first mold part,
- in the step of detecting the heat of the first mold part, the detector trails the movement device to measure a temperature of a surface of the first mold part, and
- in the step of generating the absorption profile of the first mold part, the absorption profile of the first mold part is generated based on the temperature measured by the detector.

12. A device for laser beam plastic welding comprising:
- a first receiving area;
- a first mold part arranged on the first receiving area,
- a second mold part placed on the first mold part,
- a movement device having an electromagnetic radiation source to irradiate at least one of the first mold part and the second mold part, and
- a detector detecting a heat of the first mold part when the electromagnetic radiation source irradiates only the first mold part, to generate an absorption profile of the first mold part, wherein
- an energy input is produced based on the generated absorption profile of the first mold part when the electromagnetic radiation source to irradiates the first mold part and the second mold part.

13. The device according to claim 12, further comprising a controller which is connected to the electromagnetic radiation source and the detector and controls the electromagnetic radiation source such that the first mold part is irradiated, the heat thereof is detected by the detector, and the absorption profile of the first mold part is, generated.

14. The device according to claim 12, further comprising a robot gripper picking up and placing the second mold part on the first mold part.

15. The device according to claim 12, wherein the detector is arranged on the same side as the electromagnetic radiation source.

16. The device according to claim 12, further comprising a holder holding the first mold part and the second mold part, and having a recess which is formed to be adapted to a size and a shape of the first mold part,
- wherein the electromagnetic radiation source irradiates the first mold part and the second mold part through the recess.

* * * * *